(12) United States Patent
Motoki et al.

(10) Patent No.: US 8,631,549 B2
(45) Date of Patent: Jan. 21, 2014

(54) METHOD FOR MANUFACTURING MULTILAYER ELECTRONIC COMPONENT

(75) Inventors: Akihiro Motoki, Fukui (JP); Kenichi Kawasaki, Echizen (JP); Makoto Ogawa, Fukui (JP); Shigeyuki Kuroda, Sabae (JP); Shunsuke Takeuchi, Echizen (JP); Hideyuki Kashio, Nanjyo-gun (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 317 days.

(21) Appl. No.: 13/051,013

(22) Filed: Mar. 18, 2011

(65) Prior Publication Data
US 2011/0162180 A1 Jul. 7, 2011

Related U.S. Application Data

(62) Division of application No. 12/055,372, filed on Mar. 26, 2008, now Pat. No. 7,933,113.

(30) Foreign Application Priority Data

Mar. 28, 2007 (JP) .................................. 2007-083422
Apr. 9, 2007 (JP) .................................. 2007-101319

(51) Int. Cl.
*H01G 4/228* (2006.01)
(52) U.S. Cl.
USPC ......... 29/25.42; 29/25.41; 29/25.03; 361/309
(58) Field of Classification Search
USPC .................... 29/25, 41–25.42, 830, 846, 825; 361/321.3–321.6, 303, 309
See application file for complete search history.

(56) References Cited

U.S. PATENT DOCUMENTS

| 4,687,540 A | * | 8/1987 | Singhdeo et al. ................. 216/6 |
| 5,311,651 A | * | 5/1994 | Kim et al. ..................... 29/25.42 |
| 5,712,758 A | * | 1/1998 | Amano et al. ............. 361/321.2 |

(Continued)

FOREIGN PATENT DOCUMENTS

| EP | 0 855 724 A2 | 7/1998 |
| EP | 1 890 304 A1 | 2/2008 |

(Continued)

OTHER PUBLICATIONS

Official Communication issued in corresponding Japanese Patent Application No. 2008-036807, mailed on May 29, 2012.

(Continued)

*Primary Examiner* — Minh Trinh
(74) *Attorney, Agent, or Firm* — Keating & Bennett, LLP

(57) ABSTRACT

A method for manufacturing a laminated ceramic capacitor includes a step of preparing a laminate which has a first principal surface, a second principal surface, a first end surface, a second end surface, a first side surface, and a second side surface and which includes insulating layers and internal electrodes having end portions exposed at the first or second end surface; a step of forming external electrodes on the first and second end surfaces such that plating deposits are formed on the exposed end portions of the internal electrodes so as to be connected to each other; and a step of forming thick end electrodes electrically connected to the external electrodes such that a conductive paste is applied onto edge portions of the first and second principal surfaces and first and second side surfaces of the laminate and then baked.

6 Claims, 9 Drawing Sheets

(56) References Cited

U.S. PATENT DOCUMENTS

| | | | |
|---|---|---|---|
| 6,370,015 B2 * | 4/2002 | Noda et al. | 361/321.2 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,933,113 B2 * | 4/2011 | Motoki et al. | 361/309 |
| 8,240,016 B2 * | 8/2012 | Motoki et al. | 29/25.42 |
| 8,341,815 B2 * | 1/2013 | Kunishi et al. | 29/25.42 |
| 2005/0046536 A1 | 3/2005 | Ritter et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0158774 A1 | 7/2008 | Trinh | |
| 2010/0118467 A1 | 5/2010 | Takeuchi et al. | |
| 2011/0162180 A1 * | 7/2011 | Motoki et al. | 29/25.03 |

FOREIGN PATENT DOCUMENTS

| | | |
|---|---|---|
| JP | 10-208978 A | 8/1998 |
| JP | 2002-270457 A | 9/2002 |
| JP | 2003-022929 A | 1/2003 |
| JP | 2004-146401 A | 5/2004 |
| JP | 2005-243944 A | 9/2005 |
| JP | 2007-036003 A | 2/2007 |
| JP | 2008-047907 A | 2/2008 |
| JP | 2008-187037 A | 8/2008 |
| JP | 2009-224802 A | 10/2009 |
| JP | 2010-118499 A | 5/2010 |

OTHER PUBLICATIONS

Motoki et al.; "Multilayer Electronic Component and Method for Manufacturing Multilayer Electronic Component"; U.S. Appl. No. 12/055,372, filed Mar. 26, 2008.

Motoki et al.; "Multilayer Electronic Component and Method for Manufacturing the Same"; U.S. Appl. No. 12/142,924, filed Jun. 20, 2008.

Takeuchi et al.; "Laminated Ceramic Electronic Component"; U.S. Appl. No. 12/616,844, filed Nov. 12, 2009.

Motoki et al.; "Multilayer Electronic Component and Method for Manufacturing the Same"; U.S. Appl. No. 12/770,914, filed Apr. 30, 2010.

Takeuchi et al.; "Electronic Component"; U.S. Appl. No. 13/051,018, filed Mar. 18, 2011.

* cited by examiner

METHOD FOR MANUFACTURING MULTILAYER ELECTRONIC COMPONENT

BACKGROUND OF THE INVENTION

1. Field of the Invention

The present invention relates to multilayer electronic components and methods for manufacturing the multilayer electronic components, and more particularly, to a multilayer electronic component including external electrodes formed on a laminate by plating and a method for manufacturing the multilayer electronic component.

2. Description of the Related Art

FIG. 9 shows a conventional multilayer electronic component 101, which is a typical laminated ceramic capacitor. The multilayer electronic component 101 usually includes a laminate 105, a first external electrode 108, and a second external electrode 109. The laminate 105 includes a plurality of insulating layers 102, a plurality of first internal electrodes 103, and a plurality of second internal electrodes 104. The first and second internal electrodes 103 and 104 are sheet-shaped and extend between the insulating layers 102. The laminate 105 has a first end surface 106 and a second end surface 107 opposed to the first end surface 106. The first and second external electrodes 108 and 109 are disposed on the first and second end surfaces 106 and 107, respectively. The first internal electrodes 103 have end portions which are exposed at the first end surface 106 and which are electrically connected to each other by the first external electrode 108. The second internal electrodes 104 have end portions which are exposed at the second end surface 107 and which are electrically connected to each other by the second external electrode 109.

In order to form the first and second external electrodes 108 and 109, paste electrode layers 110 are first formed such that a metal paste including a metal component and a glass component is applied on the first and second end surfaces 106 and 107 and then baked. First plating layers 111 primarily including nickel (Ni) are formed on one of the paste electrode layers 110. Second plating layers 112 primarily including tin (Sn) are formed on one of the first plating layers 111. Therefore, the first and second external electrode 108 and 109 have a three-layer structure including the paste electrode layer 110, the first plating layer 111, and the second plating layer 112.

The first and second external electrodes 108 and 109 are required to have good solder wettability because the multilayer electronic component 101 is mounted on a board by soldering. The first external electrode 108 is required to have a function of electrically connecting the first internal electrodes 103, which are electrically insulated from each other by the insulating layers 102, to each other. The second external electrode 109 is required to have a function of electrically connecting the second internal electrodes 104, which are electrically insulated from each other by the insulating layers 102, to each other. Therefore, the second plating layers 112 have good solder wettability and the paste electrode layers 110 have a function of electrically connecting the first and second internal electrodes 103 and 104. The first plating layers 111 have a function of preventing solder erosion.

The paste electrode layers 110 have a relatively large thickness of several ten to several hundred micrometers. In order to adjust the multilayer electronic component 101 to a predetermined size, the effective volume of the multilayer electronic component 101 that relates to capacitance must be reduced by the volume occupied by the paste electrode layers 110. The first and second plating layers 111 and 112 have a thickness of several micrometers. Therefore, if the first and second external electrodes 108 and 109 include the first and second plating layers 111 and 112 only, the multilayer electronic component 101 can have a larger effective volume and therefore have higher capacitance.

Japanese Unexamined Patent Application Publication No. 63-169014 discloses a method for forming external electrodes. In particular, the external electrodes are formed over both end surfaces of a laminate by electroless plating such that internal electrodes exposed at the end surfaces thereof are short-circuited.

In the method disclosed in Japanese Unexamined Patent Application Publication No. 63-169014, the catalytic activity of surfaces on which the external electrodes are formed is an important factor. In an example described in Japanese Unexamined Patent Application Publication No. 63-169014, the internal electrodes include a noble metal, such as palladium (Pd) or platinum (Pt), having high catalytic activity. This causes a significant increase in manufacturing cost.

When the internal electrodes do not include a noble metal, a catalytic metal, such as Pd, is applied to the surfaces. A process for applying the catalytic metal is very complicated. If no catalytic metal is applied to the surfaces, plating layers formed on the surfaces have low density, and therefore, the external electrodes have low reliability.

In order to enhance the soldering reliability of a multilayer electronic component, the external electrodes preferably extend to the edges of a principal surface and side surfaces of the laminate, which has a substantially rectangular parallelepiped shape, the principal and side surfaces thereof being adjacent to the end surfaces. The internal electrodes are not exposed at the principal and side surfaces. In order to allow the external electrodes to extend to the edges of the principal and side surfaces, plating layers for forming the external electrodes need to be grown from portions of the outermost internal electrodes that are exposed at the end surfaces. The amount of growth of the plating layers is large. Therefore, it is difficult to form the plating layers.

Japanese Unexamined Patent Application Publication No. 2004-146401 discloses a method for forming electroplating layers. In particular, the electroplating layers are formed by the following process: a conductive paste is applied onto edge portions of end surfaces of a laminate so as to be in contact with leading portions of internal electrodes, the edge portions extending in the direction in which internal electrodes are arranged; conductive layers are formed by firing or thermally curing the conductive paste; and the end surfaces thereof are electroplated. The electroplating layers are connected to the conductive layers.

According to the method disclosed in Japanese Unexamined Patent Application Publication No. 2004-146401, external electrodes disposed on the end surfaces may have a small thickness. The electroplating layers can be uniformly grown due to the use of electroplating. Furthermore, the presence of the conductive layers, which are made from the conductive paste, allows the external electrodes to extend to edge portions of a principal surface and side surface of the laminate, the internal electrodes not being exposed at the principal surface and side surface, the edge portions being next to the end surfaces, and the laminate having a substantially rectangular parallelepiped shape.

Although the electroplating layers can be directly connected to exposed portions of the internal electrodes, conductive portions must be formed from the conductive paste prior to electroplating such that the leading portions of the internal electrodes are electrically connected to each other. A step of applying the conductive paste onto specific regions is complicated. The conductive portions have a relatively large thickness and therefore have a relatively large volume. This causes a problem in that the effective volume is reduced.

Since the conductive layers are made from the conductive paste, glass and/or organic components are created on the conductive layers in some cases. If the conductive layers having such components thereon are subjected to plating, plating defects may be caused.

SUMMARY OF THE INVENTION

To overcome the problems described above, preferred embodiments of the present invention provide a method for manufacturing a multilayer electronic component which includes external electrodes formed substantially only by plating and which has a large effective volume and high soldering reliability, and a multilayer electronic component manufactured by this method.

According to a preferred embodiment of the present invention, a method for manufacturing a laminated ceramic capacitor includes a step of preparing a laminate which has a substantially rectangular parallelepiped shape having a first principal surface, a second principal surface, a first end surface, a second end surface, a first side surface, and a second side surface, the first and second end surfaces and the first and second side surfaces being connected to the first and second principal surfaces, and which includes a plurality of stacked insulating layers and a plurality of internal electrodes that extend between the insulating layers and that have end portions, exposed at the first or second end surface, insulated from each other, a step of forming an external electrode on each of the first and second end surfaces such that the first and second end surfaces of the laminate are directly subjected to plating so that plating deposits are formed on the exposed end portions of the internal electrodes and such that the plating deposits are grown so as to be connected to each other, and a step of forming thick end electrodes electrically connected to the external electrodes such that a conductive paste including metal particles and a glass frit is applied onto edge portions of the first and second principal surfaces and first and second side surfaces of the laminate and then baked, the edge portions being adjacent to the first and second end surfaces of the laminate.

The method preferably further includes a step of forming plating layers over the thick end electrodes and the external electrodes by plating.

In the method according to a preferred embodiment, the external electrodes are formed by electroplating, the internal electrodes are spaced from each other in the thickness direction of the laminate, the distance between the internal electrodes adjacent to each other is about 10 μm or less, the exposed end portions of the internal electrodes are withdrawn from the first or second end surface, and the distance from each exposed end portion to the first or second end surface is about 1 μm or less.

In the method according to another preferred embodiment, the external electrodes are formed by electroplating, the internal electrodes are spaced from each other in the thickness direction of the laminate, the distance between the internal electrodes adjacent to each other is about 20 μm or less, the exposed end portions of the internal electrodes project from the first or second end surface, and the distance from the top of each exposed end portion to the first or second end surface is about at least about 0.1 μm.

In the method according to still another preferred embodiment, the external electrodes are formed by electroless plating, the internal electrodes are spaced from each other in the thickness direction of the laminate, the distance between the internal electrodes adjacent to each other is about 20 μm or less, the exposed end portions of the internal electrodes are withdrawn from the first or second end surface, and the distance from each exposed end portion to the first or second end surface is about 1 μm or less.

In the method according to still another preferred embodiment, the external electrodes are formed by electroless plating, the internal electrodes are spaced from each other in the thickness direction of the laminate, the distance between the internal electrodes adjacent to each other is about 50 μm or less, the exposed end portions of the internal electrodes project from the first or second end surface, and the distance from the top of each exposed end portion to the first or second end surface is at least about 0.1 μm.

According to a preferred embodiment of the present invention, a laminated ceramic capacitor includes a laminate which having a substantially rectangular parallelepiped shape including a first principal surface, a second principal surface, a first end surface, a second end surface, a first side surface, and a second side surface, the first and second end surfaces and the first and second side surfaces being connected to the first and second principal surfaces. The laminated ceramic capacitor includes a plurality of stacked insulating layers and a plurality of internal electrodes that extend between the insulating layers and that have end portions, exposed at the first or second end surface, insulated from each other, external electrodes which are disposed on the first or second end surface so as to connect the exposed end portions of the internal electrodes to each other and which are made substantially of plating deposits, and thick end electrodes which include metal particles and a glass frit. The thick end electrodes are electrically connected to the external electrodes and disposed over edge portions of the first and second principal surfaces and first and second side surfaces of the laminate, the edge portions being adjacent to the first and second end surfaces of the laminate.

The laminated ceramic capacitor preferably further includes plating layers disposed over the thick end electrodes and the external electrodes.

Since the external electrodes are formed substantially from the plating deposits without using paste electrode layers, the multilayer electronic component has a large effective volume.

The thick end electrodes are securely formed over the edge portions of the first and second principal surfaces and first and second side surfaces of the laminate so as to be electrically connected to the external electrodes, the edge portions being adjacent to the first and second end surfaces of the laminate. This arrangement increases in the bonding reliability of the multilayer electronic component, which may be mounted on a circuit board by soldering. The presence of the thick end electrodes is effective to prevent moisture or other contaminants from penetrating the laminate through regions around the external electrodes formed by plating. This increases the reliability of the multilayer electronic component.

The thick end electrodes are formed by baking and therefore the laminate is heat-treated. Thus, the external electrodes, which are disposed on the first and second end surfaces of the laminate and formed from the plating deposits, are fused together with the internal electrodes. This allows the external electrodes to be tightly attached to the end surfaces of the laminate. Therefore, moisture and other contaminants are prevented from penetrating the laminate. This increases the reliability of the multilayer electronic component.

The thick end electrodes have a thickness greater than that of electrodes formed by plating. However, the thick end electrodes are disposed only on the edge portions of the first and second principal surfaces and first and second side surfaces of the laminate that are adjacent to the first or second end surface. Thus, the reduction of the effective volume of the multilayer electronic component is minimized.

In the method according to preferred embodiments of the present invention, the external electrodes are formed on the first and second end surfaces of the laminate and the thick end electrodes are then formed. If the thick end electrodes are formed prior to the formation of the external electrodes, undesired plating films are formed on the thick end electrodes in the step of forming the external electrodes. This causes a reduction in the effective volume of the multilayer electronic component. However, the method does not cause such a problem.

The plating layers are disposed over the thick end electrodes and the external electrodes. If the thick end electrodes and the external electrodes have insufficient solder wettability, the bonding reliability of the multilayer electronic component, which may be mounted on a circuit board by soldering, can be improved such that the plating layers are formed from a material having good solder wettability.

If the external electrodes are formed by electroplating, an electroplating solution does not substantially penetrate the laminate, for example, a Watts bath, can be used. This enables the multilayer electronic component to have high moisture resistance.

When the exposed end portions of the internal electrodes are withdrawn from the first or second end surface and the distance from each exposed end portion to the first or second end surface is about 1 µm or less, the external electrodes can be efficiently formed by electroplating so as to be uniform and dense if the distance between the internal electrodes adjacent to each other is about 10 µm or less.

When the exposed end portions of the internal electrodes project from the first or second end surface and the distance from the top of each exposed end portion to the first or second end surface is about 0.1 µm or less, the external electrodes can be efficiently formed by electroplating so as to be uniform and dense if the distance between the internal electrodes adjacent to each other is about 20 µm or less.

When the exposed end portions of the internal electrodes are withdrawn from the first or second end surface and the distance from each exposed end portion to the first or second end surface is about 1 µm or less, portions of the external electrodes that are directly bonded to the internal electrodes can be readily formed from dense, uniform plating deposits by electroless plating without using a catalyst if the distance between the internal electrodes adjacent to each other is about 20 µm or less. This enables the multilayer electronic component to have high reliability. Since the external electrodes can be formed so as to be dense without forming the internal electrodes from a metal, such as Pd or Pt, having high catalytic activity, an inexpensive metal such as Ni, Cu, or Ag can be used to form the internal electrodes. Therefore, the multilayer electronic component can be manufactured at low cost. Since the plating layers can be formed by electroless plating so as to be dense even if the internal electrodes have a thickness of less than about 1 µm, the multilayer electronic component can be manufactured so as to be compact at low cost.

When the exposed end portions of the internal electrodes project from the first or second end surface and the distance from the top of each exposed end portion to the first or second end surface is at least about 0.1 µm, portions of the external electrodes that are directly bonded to the internal electrodes can be readily formed from dense, uniform plating deposits by electroless plating without using a catalyst, if the distance between the internal electrodes adjacent to each other is about 50 µm or less.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

A multilayer electronic component 1 according to a first preferred embodiment of the present invention and a method for manufacturing the multilayer electronic component 1 will now be described with reference to FIGS. 1 to 5. The multilayer electronic component 1 is a type of laminated ceramic capacitor.

Figure 1:
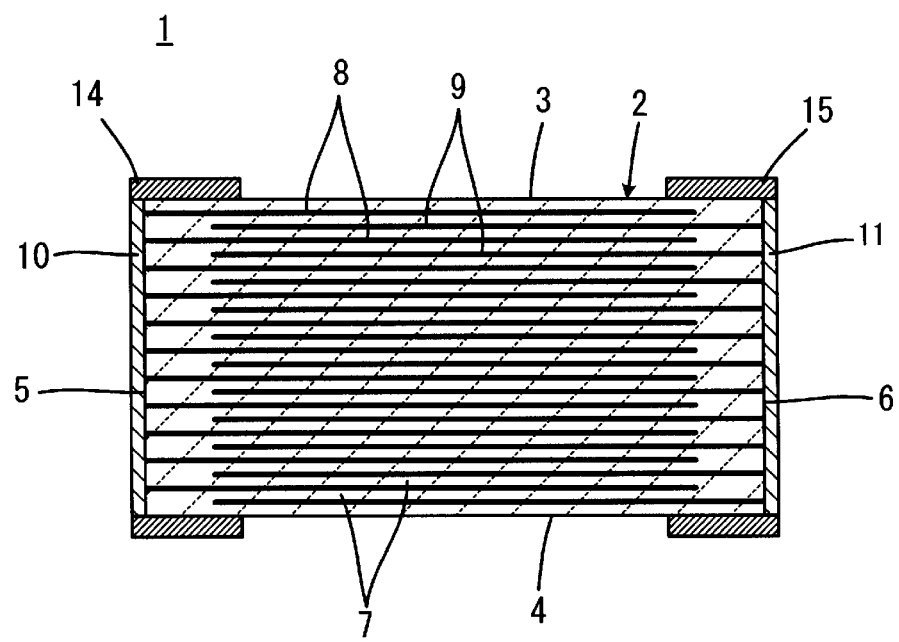
FIG. 1 is a sectional view of a multilayer electronic component according to a first preferred embodiment of the present invention.

With reference to FIG. 1, the multilayer electronic component 1 includes a laminate 2 as a component body. The laminate 2 has a substantially rectangular parallelepiped shape having a first principal surface 3, a second principal surface 4 opposed to the first principal surface 3, a first end surface 5, a second end surface 6, a first side surface (not shown), and a second side surface (not shown). The first and second end surfaces 5 and 6 are connected to the first and second principal surfaces 3 and 4.

The laminate 2 includes a plurality of insulating layers 7 extending substantially parallel to the first and second principal surfaces 3 and 4, a plurality of first internal electrodes 8 disposed between the insulating layers 7, and a plurality of second internal electrodes 9 disposed between the insulating layers 7. When the multilayer electronic component 1 is a laminated ceramic capacitor, the insulating layers 7 are made of a dielectric ceramic material. The first internal electrodes 8 each have an end portion exposed at the first end surface 5. The second internal electrodes 9 each have an end portion exposed at the second end surface 6. The exposed end portions of the first and second internal electrodes 8 and 9 are insulated from each other.

The multilayer electronic component 1 further includes a first external electrode 10 disposed on the first end surface 5 and a second external electrode 11 disposed on the second end surface 6. The first external electrode 10 electrically connects the exposed end portions of the first internal electrodes 8 to each other. The second external electrode 11 electrically connects the exposed end portions of the second internal electrodes 9 to each other. The first and second external electrodes 10 and 11 are substantially made from plating deposits.

The first and second external electrodes 10 and 11 must electrically connect the first and second internal electrodes 8 and 9, electrically insulated from each other with the insulating layers 7, to each other and prevent solder erosion. Therefore, the first and second external electrodes 10 and 11 preferably include Ni, copper (Cu), or other suitable metal.

The first and second external electrodes 10 and 11 may be formed by electroplating or electroless plating. Where the first and second external electrodes 10 and 11 are formed by electroless plating using Ni and a reductant including phosphoric acid or boric acid is used, plating deposits include phosphorus or boron. Where the first and second external electrodes 10 and 11 are formed by electroplating using Ni, plating deposits include substantially no phosphorus or boron.

The multilayer electronic component 1 further includes first thick end electrodes 14 and second thick end electrodes 15. The first thick end electrodes 14 are each disposed on an edge portion of the first or second principal surface 3 or 4 that is adjacent to the first end surface 5. The second thick end electrodes 15 are each disposed on an edge portion of the first or second principal surface 3 or 4 that is adjacent to the second end surface 6. The first and second thick end electrodes 14 and 15 are substantially made from a conductive paste including metal particles and a glass frit as described below.

The above method will now be described with particular emphasis on the first and second external electrodes 10 and 11 and the first and second thick end electrodes 14 and 15. Since the first and second thick end electrodes 14 and 15 are formed subsequently to the first and second external electrodes 10 and 11, a procedure for forming the first and second external electrodes 10 and 11 will first be described with reference to FIGS. 2 to 5.

Figure 2:
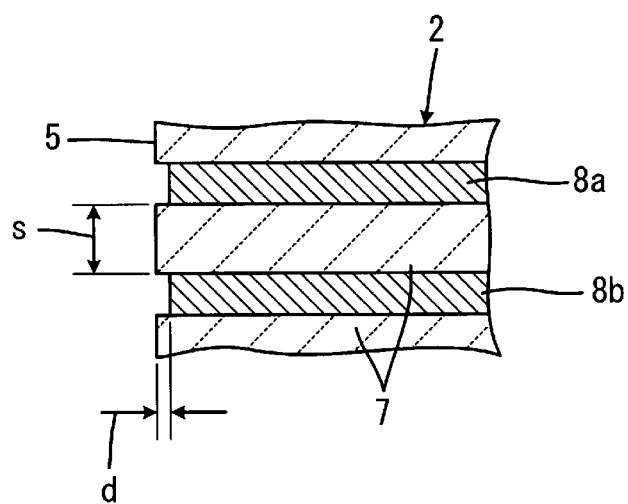
FIG. 2 is an enlarged sectional view of exposed end portions of internal electrodes arranged in a laminate included in the multilayer electronic component shown in FIG. 1.

FIG. 2 is an enlarged view of a region near the first end surface 5 of the laminate 2 shown in FIG. 1. The first internal electrodes 8 are partially exposed at the first end surface 5 as described above. FIG. 2 shows a state in which the first external electrode 10 is not yet provided on the first end surface 5. Reference numerals 8a and 8b denote two of the first internal electrodes 8 that are located in the region shown in FIG. 2. FIG. 2 shows an arbitrarily selected area near the first end surface 5, at which the first internal electrodes 8 are partially exposed, and does not show any particular one of the first internal electrodes 8. The first internal electrodes 8, that is, the first internal electrodes 8a and 8b are electrically insulated from each other in the state shown in FIG. 2.

The second end surface 6 and the second internal electrodes 9, which are exposed at the second end surface 6, are substantially the same as the first end surface 5 and the first internal electrodes 8, respectively, and therefore will not be shown or described in detail.

With reference to FIG. 2, the first internal electrodes 8a and 8b are spaced from each other in the thickness direction of the insulating layers 7 and are adjacent to each other. The distance between the first internal electrodes 8a and 8b is defined as a first distance s. The first end surface 5 is spaced from the exposed end portion of the first internal electrodes 8a and 8b. The distance from the first end surface 5 to the exposed end portion of each of the first internal electrodes 8a and 8b is defined as a second distance d. The second distance d slightly varies in the longitudinal direction of the first internal electrodes 8a and 8b, that is, in the direction perpendicular to the plane of FIG. 2. Therefore, the second distance d is a mean value.

Where the first external electrode 10 is formed by electroplating, the first distance s and the second distance d are preferably about 10 μm or less and 1 μm or less, respectively, before the first external electrode 10 is formed on the laminate 2.

In the multilayer electronic component 1, the insulating layers 7 are made of, for example, a barium titanate dielectric material and the first and second internal electrodes 8 and 9 primarily include, for example, a base metal such as Ni or Cu. After the laminate 2 is fired, the first and second internal electrodes 8 and 9 are likely to be significantly withdrawn from the first and second end surfaces 5 and 6, respectively. In order to adjust the second distance d to about 1 μm or less, the insulating layers 7 may be ground by sandblasting, barreling, or other suitable methods.

If the second distance d is about 1 μm or less after the laminate 2 is fired, the insulating layers 7 are preferably ground such that surface oxides are removed from the exposed end portions of the first and second internal electrodes 8 and 9 and the exposed end portions thereof are surface-roughened. This is because electroplating deposits can be readily formed in an electroplating step as described below.

Figure 3:
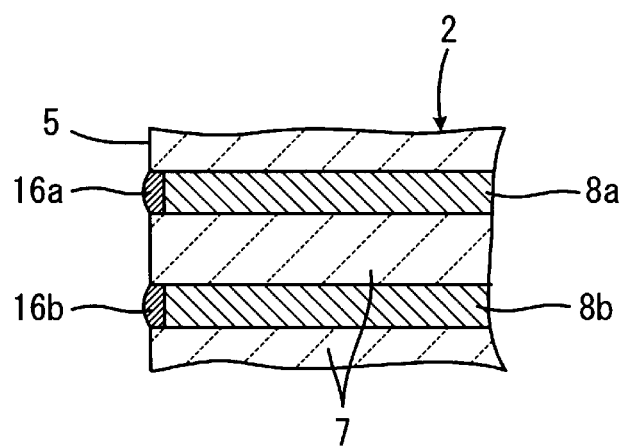
FIG. 3 is a sectional view of plating deposits on the exposed end portions of the internal electrodes shown in FIG. 2.

The laminate 2 shown in FIG. 2 is subjected to electroplating, whereby plating deposits 16a and 16b are formed as shown in FIG. 3. When the multilayer electronic component 1 is chip-shaped, the first and second external electrodes 10 and 11 are preferably formed by electroplating such that the laminate 2 having no first or second external electrode 10 or 11 and a conductive medium are charged into a vessel equipped with power-feeding terminals, the laminate 2 is immersed into a plating solution including metal ions, and the vessel is supplied with electricity while the vessel is rotated, swung, or vibrated.

In the electroplating of the laminate 2, the metal ions receive electrons through the conductive medium to form the plating deposits 16a and 16b on the exposed end portions of the first internal electrodes 8a and 8b, which are conductive portions of the laminate 2. FIG. 3 shows the plating deposits 16a and 16b on the exposed end portions of the first internal electrodes 8a and 8b. The first internal electrodes 8a and 8b shown in FIG. 3 are electrically insulated from each other.

Figure 4:
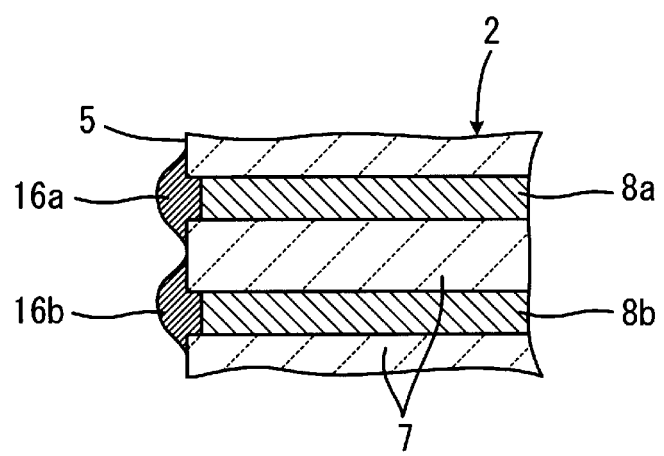
FIG. 4 is a sectional view of the grown plating deposits shown in FIG. 3.

The duration of the supply of electricity promotes the deposition of the metal ions. Thereby, the plating deposits 16a and 16b are further grown. FIG. 4 illustrates the growth of the plating deposits 16a and 16b. The collision probability with the conductive medium increases with the growth of the plating deposits 16a and 16b, thereby increasing the deposition rate of the metal ions.

Figure 5:
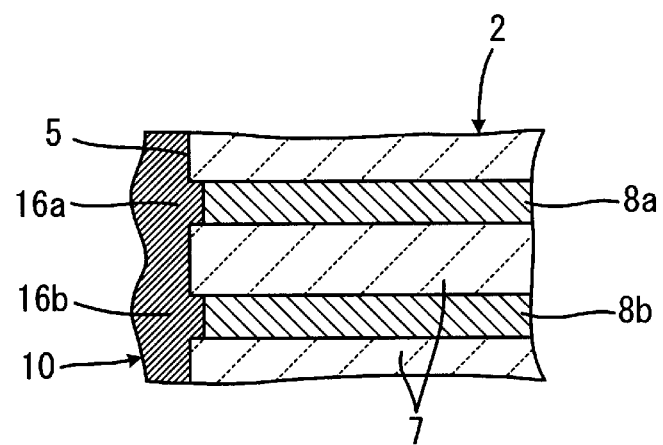
FIG. 5 is a sectional view showing a state in which the grown plating deposits shown in FIG. 4 unite with each other to form an external electrode.

The grown plating deposits 16a and 16b come into contact with each other to unite with each other. This results in the formation of the first external electrode 10, which electrically connects the exposed end portions of the first internal electrodes 8 to each other. FIG. 5 shows this situation.

The procedure, described above with reference to FIGS. 2 to 5, for forming the first and second external electrodes 10 and 11 makes use of high deposition efficiency and high malleability due to electroplating. Therefore, the grown plating deposits 16a and 16b extend substantially parallel to the first and second end surfaces 5 and 6 and then come into contact with each other to unite with each other. Deposition efficiency and malleability due to electroplating can be improved by adjusting plating conditions, such as the type and content of a metal in a plating bath, the current density of the plating bath, and the type and amount of an additive used.

In the laminate 2 that is not yet subjected to electroplating, the distance between the first internal electrodes 8a and 8b adjacent to each other, that is, the first distance s is about 10 µm or less and the distance from the first end surface 5 to the exposed end portion of each of the first internal electrodes 8a and 8b, that is, the second distance d is about 1 µm or less.

The smaller the first distance s, the more readily the first external electrode 10 can be formed, because the amount of growth required for the plating deposits 16a and 16b to come into contact with each other is relatively small. It is not preferable that the first distance s exceeds about 10 µm, because there is a low probability that the plating deposits 16a and 16b will come into contact with each other even when the plating deposits 16a and 16b are grown.

When the second distance d is about 1 µm or less, there is a high probability that the conductive medium comes into contact with the exposed end portions of the first internal electrodes 8a and 8b during electroplating. Thus, the metal ions are readily deposited. This enables the plating deposits 16a and 16b to be highly uniform.

The vessel is supplied with electricity during electroplating while the vessel is rotated, swung, or vibrated as described above. In particular, the vessel is preferably rotated. The rotation speed of the vessel is preferably about 10 rpm or more, because the plating deposits 16a and 16b are likely to be grown in parallel to the first end surface 5 and therefore the first external electrode 10 can be efficiently formed.

The first and second external electrodes 10 and 11 preferably include Ni as a main component. In the manufacture of ordinary multilayer electronic ceramic components, neutral or slightly acidic plating baths are used because ceramic ingredients need to be prevented from being eluted from the ordinary multilayer electronic ceramic components, and therefore, no strongly acidic or alkaline plating baths can be used. In this case, ions of metals used for plating are usually unstable. In order to avoid this problem, complexing agents are usually used to form complexes. If a complexing agent is used to form the first and second external electrodes 10 and 11 directly on the first and second end surfaces 5 and 6, respectively, the complexing agent may penetrate between the insulating layers 7 and the first and second internal electrodes 8 and 9 to dissolve a ceramic ingredient included in the insulating layers 7 and/or a material for forming the first and second internal electrodes 8 and 9. Therefore, a slight acidic ion bath including no complexing agent is preferably used. A Watts bath, adjusted to a pH of about 2.5 to about 6.0, for Ni plating is an example of such an ion bath and is preferably used to form the first and second external electrodes 10 and 11.

Where the first and second external electrodes 10 and 11 are formed by electroplating using Ni, a Ni plating bath used for electroplating preferably includes a brightener in addition to Ni ions. The brightener, which may have various functions depending on its type, promotes the formation of the first and second external electrodes 10 and 11 and enables the first and second external electrodes 10 and 11 to have a sufficient coverage even if the first and second external electrodes 10 and 11 have a small thickness.

The brightener has the following functions: (1) a function of enhancing the capability of the plating deposits to extend horizontally, (2) a function of enhancing the malleability of coatings, and (3) a function of smoothing the coatings to improve the coverage of recesses. These functions enable the plating deposits to grow horizontally. Thus, the first and second external electrodes 10 and 11 can be readily formed. The brightener additionally has the following functions: (4) a function of covering micro-recesses with coatings to improve the adhesion strength thereof and (5) a function of reducing stresses applied to coatings to prevent the coatings from being peeled off.

The brightener usually includes sulfur and preferably has a sulfo group.

Alternatively, the first and second external electrodes 10 and 11 may primarily include Cu. With Cu, it is difficult to prepare an ion bath including no complexing agent. However, Cu has a higher ability to form plating deposits, higher throwing power, and higher coverage as compared to Ni and is effectively forms a uniform film. These advantages of Cu are apparent after the first and second external electrodes 10 and 11 are formed from Cu and then heat-treated.

The first and second external electrodes 10 and 11 are formed by electroplating as described above and may be formed by electroless plating.

Where the first and second external electrodes 10 and 11 are formed by electroless plating, the laminate 2 shown in FIG. 2 is placed into a plating vessel filled with a plating solution including a reductant and ions of a metal with a deposition potential electrochemically nobler than the redox potential of the reductant. The laminate 2 is shaken in the plating solution such that the plating vessel is rotated, swung, tilted, or vibrated, whereby electrons produced by the interaction between the reductant and the first internal electrodes 8a and 8b are supplied to the first internal electrodes 8a and 8b. The metal ions in the plating solution receive the supplied electrons to form the plating deposits 16a and 16b on the exposed end portions of the first internal electrodes 8a and 8b. FIG. 3 shows the plating deposits 16a and 16b on the exposed end portions of the first internal electrodes 8a and 8b. In this state, the first internal electrodes 8a and 8b are electrically insulated from each other.

The duration of electroless plating promotes the deposition of the metal ions. Thus, the plating deposits 16a and 16b are further grown. FIG. 4 illustrates the growth of the plating deposits 16a and 16b. The deposition rate of the metal ions increases with the growth of the plating deposits 16a and 16b.

The grown plating deposits 16a and 16b come into contact with each other to unite with each other. This results in the formation of the first external electrode 10, which electrically connects the exposed end portions of the first internal electrodes 8 to each other. FIG. 5 shows this situation.

The laminate 2 and a medium may be placed into the plating vessel filled with the plating solution and then shaken during electroless plating as with electroplating. The medium, which need not be conductive, enhances the effect of shaking the laminate 2. The medium collides with the plating deposits 16a and 16b to assist the plating deposits 16a and 16b to expand along the first end surface 5 as shown in FIG. 4.

The phenomena shown in FIGS. 2 to 5 are due to the high growth power of the plating deposits 16a and 16b. The plating deposits 16a and 16b expand in parallel to the first end surface 5 during the growth thereof and then come into contact with each other to unite with each other.

In order to promote the phenomena, the first distance s and the second distance d are preferably about 20 µm or less and 1 µm or less, respectively, before the first external electrode 10 are formed on the laminate 2.

When the first distance s is about 20 µm or less, the first external electrode 10 can be formed and is dense, because the amount of growth required for the plating deposits 16a and 16b to come into contact with each other is relatively small as shown in FIGS. 3 and 4.

When the second distance d is about 1 μm or less, the metal ions are readily deposited on the exposed end portions of the first internal electrodes 8a and 8b. This promotes the formation of the plating deposits 16a and 16b to allow the first external electrode 10 to be readily formed and enables the first external electrode 10 to be dense.

In order to adjust the second distance d to about 1 μm or less, the insulating layers 7 may be ground by sandblasting, barreling, or other suitable method as described above with respect to electroplating.

With the use of electroplating, the insulating layers 7 are preferably ground such that surface oxides are removed from the exposed end portions of the first and second internal electrodes 8 and 9 and the exposed end portions thereof are surface-roughened, even if the second distance d is about 1 μm or less after the laminate 2 is fired. This is because the plating deposits 16a and 16b can be securely attached to the first and second internal electrodes 8 and 9 during electroplating.

The grinding described above allows dense metal coatings to be formed. The first and second internal electrodes 8 and 9 need not have a large thickness and may have a thickness of less than about 1 μm. The first and second internal electrodes 8 and 9 may have a thickness as small as about 0.2 μm. This is advantageous in cost and size reduction.

The first and second internal electrodes 8 and 9 need not include a metal, such as Pd or Pt, having high catalytic activity and may primarily include a metal such as Ni, Cu, or silver (Ag). When the first and second internal electrodes 8 and 9 primarily include Ni, a hypophosphite reductant, such as sodium hypophosphite, is preferably used for electroplating. When the first and second internal electrodes 8 and 9 primarily include Cu or Ag, an aldehyde reductant, such as formic aldehyde, is preferably used for electroplating.

When the first and second internal electrodes 8 and 9 primarily include Ni, Cu, or Ag, a Ni, Cu, or Ag alloy including another metal component may be used to form the first and second internal electrodes 8 and 9.

Second Preferred Embodiment

Figure 6:
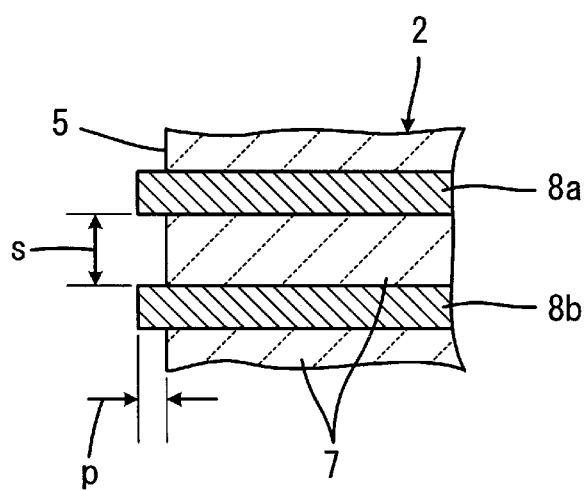
FIG. 6 is a sectional view of a laminate included in a multilayer electronic component according to a second preferred embodiment of the present invention.

FIG. 6 shows a region near a first end surface 5 of a laminate 2 included in a multilayer electronic component 1 according to a second preferred embodiment of the present invention. FIG. 6 corresponds to FIG. 2. The same elements as those shown in FIG. 2 are designated in FIG. 6 by the same reference numerals as those shown in FIG. 2 and will not be described in detail.

In this preferred embodiment, the multilayer electronic component 1 characteristically includes first internal electrodes 8a and 8b projecting from the first end surface 5. The distance from the first end surface 5 to the top of an exposed end portion of each of the first internal electrodes 8a and 8b is herein defined as a third distance p. Where a first external electrode 10 and a second external electrode 11 are formed by electroplating, the third distance p is preferably at least about 0.1 μm. The distance between the first internal electrodes 8a and 8b adjacent to each other, that is, the first distance s need not be about 10 μm or less and may be about 20 μm or less.

The third distance p slightly varies in the longitudinal direction of the first internal electrodes 8a and 8b, that is, in the direction perpendicular to the plane of FIG. 6. Therefore, the third distance p is a mean value.

Since the first distance s and the third distance p are set as described above, there is a higher probability that the first internal electrodes 8a and 8b are brought into contact with a conductive medium as compared to that described in the first preferred embodiment.

A second end surface 6 and second internal electrodes 9 (see FIG. 1) are substantially the same as the first end surface 5 and first internal electrodes 8 described above and therefore will not be described in detail.

In order to enable the first internal electrodes 8a and 8b to project from the first end surface 5, the following technique may be used: a technique in which the intensity of grinding is high, a technique using an abrasive which includes metal particles and therefore has high hardness, or other suitable methods. When the insulating layers 7 are made of a ceramic material, the insulating layers 7 can be readily ground by sandblasting or barreling such that the first internal electrodes 8a and 8b project from the first end surface 5. Alternatively, the insulating layers 7 can be readily ground using a laser with high selectivity and efficiency.

For electroplating, the first distance s and the third distance p are preferably about 20 μm or less and at least about 0.1 μm, respectively. For electroless plating, the first distance s and the third distance p are preferably about 50 μm or less and at least about 0.1 μm, respectively.

Since the third distance p is at least about 0.1 μm as described above, the deposition power of electroless plating is high and the growth power of plating deposits is high. Therefore, plating layers that are denser than those described in the first preferred embodiment can be formed. Since the first distance s is relatively large, the degree of freedom in designing multilayer electronic components is improved.

Third Preferred Embodiment

Figure 7:
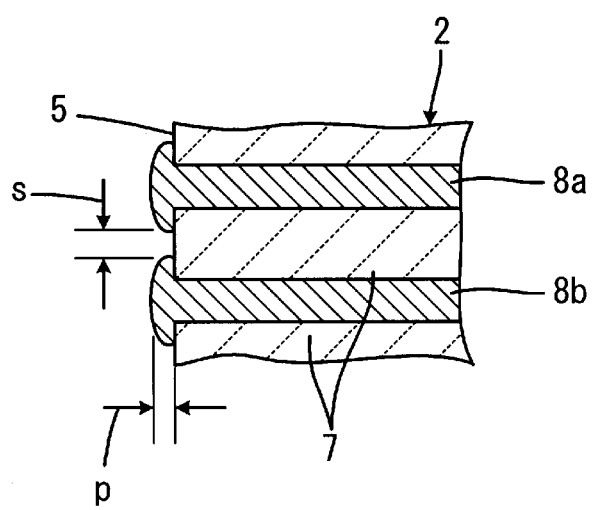
FIG. 7 is a sectional view of a laminate included in a multilayer electronic component according to a third preferred embodiment of the present invention.

FIG. 7 shows a region near a first end surface 5 of a laminate 2 included in a multilayer electronic component 1 according to a third preferred embodiment of the present invention. FIG. 7 corresponds to FIG. 6. The same elements as those shown in FIG. 6 are designated in FIG. 7 by the same reference numerals as those shown in FIG. 6 and will not be described in detail.

In this preferred embodiment, the multilayer electronic component 1 characteristically includes first internal electrodes 8a and 8b having projecting portions projecting from the first end surface 5. For electroplating, the distance between the first internal electrodes 8a and 8b adjacent to each other, that is, the first distance s is preferably about 20 μm or less and the distance from the first end surface 5 to the top of each projecting portion, that is, the third distance p is preferably at least about 0.1 μm. For electroless plating, the first distance s and the third distance p are preferably about 50 μm or less and at least about 0.1 μm, respectively.

A step described with reference to FIG. 7 is performed subsequently to that described with reference to FIG. 6 as required. When the first internal electrodes 8a and 8b have end portions projecting from the first end surface 5, the end portions of the first internal electrodes 8a and 8b are flattened by further grinding the first internal electrodes 8a and 8b and therefore are expanded in parallel to the first end surface 5, whereby the end portions are transformed into the projecting portions. As a result, although the third distance p is disadvantageously less than that shown in FIG. 6, the first distance s is advantageously less than that shown in FIG. 6.

In the above-described configuration, the amount of growth of plating deposits formed by electroplating or electroless plating may be substantially reduced. This leads to an increase in the uniformity of the plating deposits and also leads to an increase in plating efficiency. Even if the insulating layer 7 disposed between the first internal electrodes 8a and 8b has a relatively large thickness, the first distance s can be relatively small.

After a first external electrode 10 and a second external electrode 11 are formed, first thick end electrodes 14 and second thick end electrodes 15 are formed so as to be electrically connected to the first and second external electrodes 10 and 11, respectively.

In particular, the first and second thick end electrodes 14 and 15 are formed such that a conductive paste including metal particles and a glass frit is prepared, applied onto edge portions of a first principal surface 3, second principal surface 4, first side surface, and second side surface of the laminate 2 that are adjacent to the first or second end surface 5 or 6, and then fired.

Since the multilayer electronic component 1 may be mounted on a circuit board including conductive lands arranged thereon by soldering, the first and second thick end electrodes 14 and 15 are effective to improve the bonding reliability of the multilayer electronic component 1. Furthermore, the presence of the first and second thick end electrodes 14 and 15 prevents moisture and other contaminants from penetrating the laminate 2 through regions around the first and second external electrodes 10 and 11. This increases the reliability of the multilayer electronic component 1.

The first and second thick end electrodes 14 and 15 have a thickness greater than that of electrodes formed by plating. However, the first and second thick end electrodes 14 and 15 are disposed only on the edge portions of the first and second principal surfaces 3 and 4 and first and second side surfaces of the laminate 2 that are adjacent to the first or second end surface 5 or 6. Thus, the reduction of the effective volume of the multilayer electronic component 1 is minimized.

When the first and second external electrodes 10 and 11 are formed by plating, plating layers are formed on portions of the first and second principal surfaces 3 and 4 and side surfaces of the laminate 2. Since the plating layers have an insufficient thickness and are nonuniform, the absence of the first and second thick end electrodes 14 and 15 may cause problems during solder mounting.

Fourth Preferred Embodiment

Figure 8:
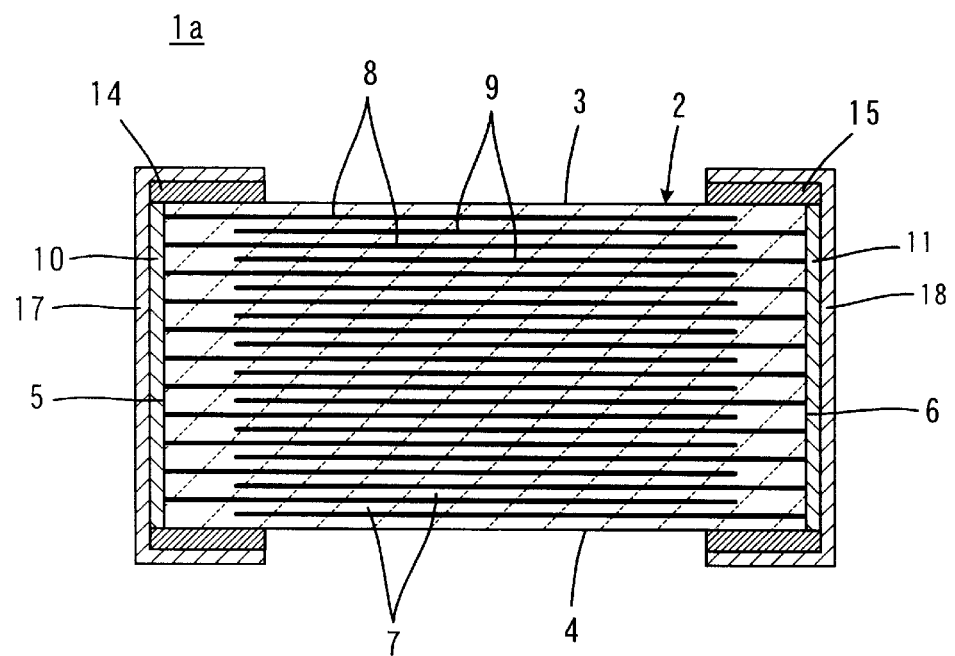
FIG. 8 is a sectional view of a multilayer electronic component according to a fourth preferred embodiment of the present invention.
Figure 9:
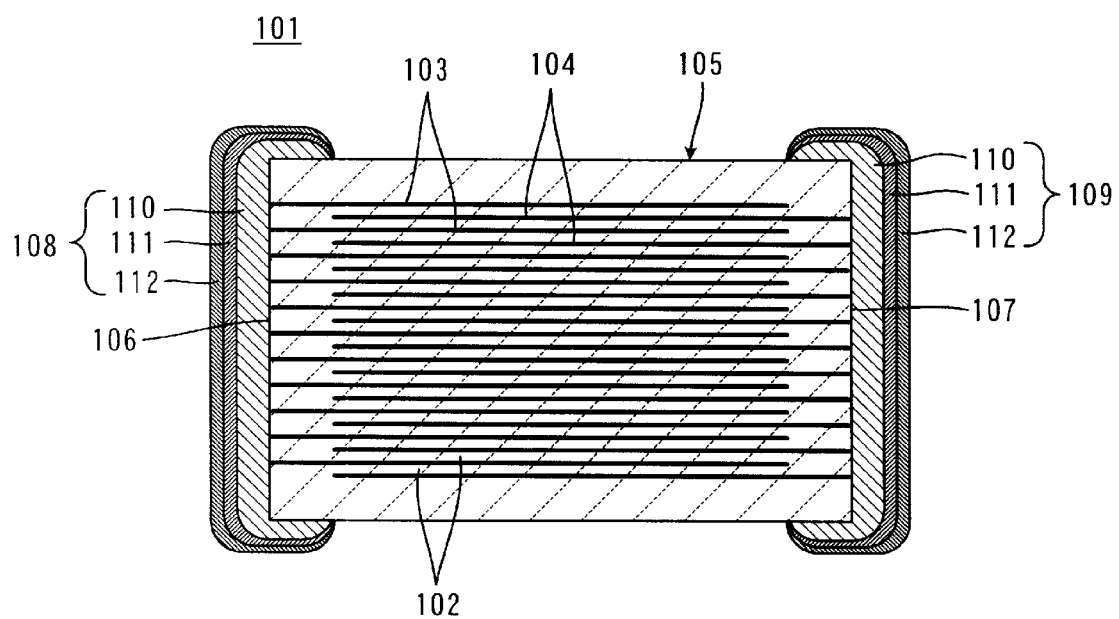
FIG. 9 is a sectional view of a conventional multilayer electronic component.

FIG. 8 shows a multilayer electronic component 1a according to a fourth preferred embodiment of the present invention. FIG. 8 corresponds to FIG. 1. The same members as those shown in FIG. 1 are designated in FIG. 8 by the same reference numerals as those shown in FIG. 1 and will not be described in detail.

In the multilayer electronic component 1a, after a first external electrode 10, a second external electrode 11, first thick end electrodes 14, and second thick end electrodes 15 are formed, a first plating layer 17 is formed over the first external electrode 10 and the first thick end electrodes 14 and a second plating layer 18 are formed over the second external electrode 11 and the second thick end electrodes 15 by plating.

When the first and second external electrodes 10 and 11 and the first and second thick end electrodes 14 and 15 have insufficient solder wettability, the first and second plating layers 17 and 18 are formed from a material having good solder wettability, thereby improving the bonding reliability of the multilayer electronic component 1a, which may be mounted on a circuit board by soldering. Examples of such a material having good solder wettability include Sn and gold (Au).

The first and second plating layers 17 and 18 may have a single-layer structure, a two-layer structure including a Ni plating layer and a Sn plating layer disposed thereon, or a structure having three or more layers.

The first and second thick end electrodes 14 and 15 are formed by baking and therefore a laminate 2 is heat-treated. Thus, the first and second external electrodes 10 and 11 are fused together with first internal electrodes 8 and second internal electrodes 9, respectively, the first and second external electrodes 10 and 11 being formed from plating deposits and being disposed on a first end surface 5 and second end surface 6, respectively, of the laminate 2. This enables the first and second external electrodes 10 and 11 to be securely attached to the first and second end surfaces 5 and 6 of the laminate 2. Therefore, moisture or other contaminants are prevented from penetrating the laminate 2. This increases the reliability of the multilayer electronic component 1a.

The first and second thick end electrodes 14 and 15 are preferably formed subsequently to the formation of the first and second external electrodes 10 and 11. The first and second plating layers 17 and 18 are preferably formed subsequently to the formation of the first and second thick end electrodes 14 and 15, because a plating solution is prevented from penetrating the laminate 2.

Advantages produced by the fusion of the first and second external electrodes 10 and 11 with the first and second internal electrodes 8 and 9 are outstanding when the temperature of heat treatment is at least about 800° C. Furthermore, the advantages produced by the fusion are outstanding when the first and second internal electrodes 8 and 9 primarily include Ni and the first and second external electrodes 10 and 11 primarily include Cu.

The present invention has been described above with reference to the preferred embodiments and the drawings. However, various modifications may be made within the scope of the present invention.

Examples of a multilayer electronic component according to a preferred embodiment of the present invention include multilayer chip capacitors, multilayer chip inductors, and multilayer chip thermistors.

Insulating layers included in the multilayer electronic component must to have an electrically insulating function and a material for forming the insulating layers is not particularly limited. The insulating layers may be made of a dielectric ceramic material, a piezoelectric ceramic material, a semiconductor ceramic material, a magnetic ceramic material, or resin.

Experiments

Experiments performed to determine the preferred scope of the present invention or to confirm advantages of the peak intensity will now be described.

Experiment 1

In this experiment, electroplating was used to form external electrodes included in each sample.

Laminates for multilayer electronic capacitors were prepared. The laminates had a length of about 3.1 mm, a width of about 1.55 mm, and a thickness of about 1.55 mm and included insulating layers made of a barium titanate dielectric material and internal electrodes primarily including Ni. Some of the laminates had a first distance s of up to about 10 μm and the others had a first distance s of up to about 13 μm as shown in Table 1 (see FIG. 2 or 6). The internal electrodes had an average thickness of about 1.0 μm.

The two types of laminates were sandblasted using alumina abrasive particles. In particular, some of the laminates were sandblasted for different times with a pressure of about 0.25 MPa so as to have a second distance d of up to about 1 μm or about 2 μm and the others were sandblasted for different times with a pressure of about 0.50 MPa so as to have a third distance p of up to about 1 μm as shown in Table 1.

After the sandblasting of the laminates was finished, the abrasive particles were washed off from the laminates, which were then dried.

The laminates were placed into a rotary barrel having a volume of about 300 cc together with a metal medium having a diameter of about 0.6 mm. The rotary barrel was immersed into a 60° C. Watts bath, adjusted to about pH 4.2, for Ni plating. A current was applied to the rotary barrel at a current density of about 0.04 A/dm$^2$ for about 300 minutes while the rotary barrel was being rotated at about 60 rpm, whereby external electrodes, made of Ni, having a thickness of about 4.0 μm were formed on end surfaces of the laminates at which the internal electrodes were exposed. The laminates were used to prepare Samples 1 to 8 shown in Table 1.

Thick end electrodes were formed only on the laminates used to prepare Samples 7 and 8 as described below. A Cu powder and a glass frit primarily including a ZnO—B$_2$O$_3$—SiO$_2$ glass component were mixed with an appropriate amount of an organic vehicle. The mixture was kneaded with three rollers, whereby a conductive paste was prepared. The conductive paste was applied on edge portions of principal and side surfaces of the laminates used to prepare Samples 7 and 8, the edge portions being adjacent end surfaces of the laminates used to prepare Samples 7 and 8, and then baked at about 800° C. for about five hours in a nitrogen atmosphere, whereby the thick end electrodes were formed so as to be electrically connected to the external electrodes.

The laminates used to prepare Samples 1 to 8 were placed into a rotary barrel, which was immersed into a 33° C. Sn plating bath (Sn-235, manufactured by Dipsol Chemicals Co., Ltd.) adjusted to about pH 5.0. A current was applied to the rotary barrel at a current density of about 0.1 A/dm$^2$ for about 60 minutes while the rotary barrel was being rotated at about 12 rpm, whereby Sn plating layers with a thickness of about 4.0 μm were formed on the external electrodes of the laminates used to prepare Samples 1 to 6 and also formed over the external electrodes and thick end electrodes of the laminates used to prepare Samples 7 and 8. Samples 1 to 8 defining multilayer ceramic capacitors were prepared as described above.

Samples 1 to 8 were checked such that the external electrodes of 100 of Samples 1, 2, 3, 4, 5, 6, 7, or 8 were observed by microscopy, whereby the percentage of plating defects in each external electrode was determined on an area basis. The percentage of the plating defects was defined as a skip rate. "Skip rate," as used in the present application, is the percentage of the end surfaces that were not covered during plating. Samples 3, 5, 6, 7, and 8 had a skip rate of substantially 0%. The time required to enable the skip rate of each of Samples 3, 5, 6, 7, and 8 to reach substantially 0% was measured. The averages of measurements of Samples 1 to 8 are shown in Table 1.

Samples 1 to 8 were subjected to a pressure cooker bias test (PCBT) such that a voltage of about 6.3 V was applied to each of Samples 1 to 8 for about 72 hours in an atmosphere, adjusted to about 1 atm and about 125° C., having a relative humidity of about 95%. Resulting Samples 1 to 8 were checked by counting the number of defectives per 100 of Samples 1, 2, 3, 4, 5, 6, 7, or 8. The results of this experiment are summarized in Table 1.

TABLE 1

| Samples | Second distance d or third distance p (μm) | First distance s (μm) | Skip rate (%) | Process time (minutes) | Thick end electrodes | Number of defective samples determined by PCBT |
|---|---|---|---|---|---|---|
| 1 | d = 2 | 10 | 40 | — | Not included | 100/100 |
| 2 | d = 2 | 13 | 60 | — | Not included | 100/100 |
| 3 | d = 1 | 10 | 0 | 120 | Not included | 2/100 |
| 4 | d = 1 | 13 | 50 | — | Not included | 100/100 |
| 5 | p = 1 | 10 | 0 | 90 | Not included | 1/100 |
| 6 | p = 1 | 13 | 0 | 90 | Not included | 2/100 |
| 7 | d = 1 | 10 | 0 | 120 | Included | 0/100 |
| 8 | p = 1 | 10 | 0 | 90 | Included | 0/100 |

Samples 1 to 6, which include no thick end electrodes, are first compared to each other. As shown in Table 1, Samples 1 and 2 have a large second distance d of about 2 μm, that is, end portions of the internal electrodes are significantly withdrawn from the end surfaces of the laminates of Samples 1 and 2. Thus, Samples 1 and 2 have a large skip rate of about 40% and about 60%, respectively. Samples 3 have a small second distance d of about 1 μm and therefore have a skip rate of substantially 0%. Although Samples 4 have a small second distance d of about 1 μm, Samples 4 have a large first distance s exceeding about 10 μm and therefore have a large skip rate of about 50%.

Samples 5 and 6 have a third distance p of about 1 μm, that is, end portions of the internal electrodes project from the end surfaces of the laminates of Samples 5 and 6. Thus, the time required to form the external electrodes of Samples 5 and 6 is shorter as compared to Samples 3, that is, the plating efficiency of Samples 5 and 6 is high. In particular, Samples 6 have a large first distance s of about 13 μm and a skip rate of substantially 0%.

Comparisons made between Samples 3 and 7 and those between to Samples 5 and 8 in view of the presence or absence of the thick end electrodes show that there are differences in the number of the defective items determined by the PCBT between Samples 3 and 7 and between Samples 5 and 8. That is, a small number of Samples 3 and 5, which included no thick end electrodes, were determined to be defective by the PCBT but none of Samples 7 or 8, which included the thick end electrodes, was determined to be defective by the PCBT.

Experiment 2

In this experiment, electroless plating was used to form external electrodes included in Samples 11 to 24.

Table 2 summarizes four types of Conditions A to D, used in this experiment, for electroless plating.

TABLE 2

| | |
|---|---|
| A | Nickel (II) sulfate hexahydrate: 0.1 mol/L<br>sodium hypophosphite monohydrate: 0.2 mol/L<br>Gluconolactone: 0.3 mol/L<br>Bismuth sulfate: $1 \times 10^5$ mol/L<br>pH: 7.0<br>Temperature: 65° C.<br>0.6 mm-diameter iron medium: 100 mL<br>Rotation: 10 rpm for 100 minutes |
| B | Nickel (II) sulfate hexahydrate: 0.1 mol/L<br>sodium hypophosphite monohydrate: 0.2 mol/L<br>Gluconolactone: 0.3 mol/L<br>Bismuth sulfate: $1 \times 10^5$ mol/L<br>pH: 7.0<br>Temperature: 65° C.<br>0.6 mm-diameter nickel medium: 100 mL<br>Rotation: 10 rpm for 100 minutes |
| C | Cupric sulfate pentahydrate: 10 g/L<br>Formaldehyde: 4 g/L<br>Sodium potassium tartrate tetrahydrate: 30 g/L<br>Polyethylene glycol: 1 g/L<br>Sodium hydroxide: 5 g/L<br>Temperature: 40° C.<br>Aeration: 0.5 L/minute<br>0.6 mm-diameter iron medium: 100 mL<br>Rotation: 10 rpm for 100 minutes |
| D | Cupric sulfate pentahydrate: 10 g/L<br>Formaldehyde: 5 g/L<br>Sodium potassium tartrate tetrahydrate: 30 g/L<br>Polyethylene glycol: 1 g/L<br>Sodium hydroxide: 5 g/L<br>Temperature: 40° C.<br>Aeration: 0.5 L/minute<br>0.6 mm-diameter copper medium: 100 mL<br>Rotation: 10 rpm for 100 minutes |

Laminates for multilayer electronic capacitors were prepared. The laminates had a length of about 1.5 mm, a width of about 0.75 mm, and a thickness of about 0.75 mm and included insulating layers made of a barium titanate dielectric material and internal electrodes. The following items were as shown in Table 3: the distance between the internal electrodes adjacent to each other, that is, the first distance s (see FIG. 2 or 6) of each sample, the thickness of the internal electrodes, and metals for forming the internal electrodes. The internal electrodes are exposed at end surfaces of the laminate and are slightly withdrawn from the end surfaces thereof. The distance from an end surface of one of the laminates to one of the internal electrodes, that is, the second distance d (see FIG. 2) of each sample was up to about 10 μm.

The laminates were sandblasted using alumina abrasive particles. In particular, some of the laminates were sandblasted for different times with a pressure of about 0.25 MPa so as to have a second distance d of up to about 0.1 μm, about 1 μm, or about 2 μm and the others were sandblasted for different times with a pressure of about 0.50 MPa so as to have a third distance p (see FIG. 6) of up to about 0.1 μm or about 1 μm as shown in Table 3.

After the sandblasting of the laminates was finished, the abrasive particles were washed off from the laminates, which were then dried.

Two thousand of the laminates were placed into a rotary barrel having a volume of about 300 cc. As shown in Table 3, Ni or Cu external electrodes having a thickness of about 5 μm were formed over end surfaces of the laminates at which the internal electrodes were exposed under Condition A, B, C, or D shown in Table 2 by electroless plating. The laminates were used to prepare Samples 11 to 24 shown in Table 3.

Thick end electrodes were formed only on the laminates used to prepare Samples 22 to 24 in the same manner as that described in Experiment 1.

The laminates, used to prepare Samples 19, 20, 21, and 24, including the Cu external electrodes were placed into a rotary barrel. The rotary barrel was immersed into a 60° C. Watts bath, adjusted to about pH 4.2, for Ni plating. A current was applied to the rotary barrel at a current density of about 0.2 $A/dm^2$ for about 60 minutes through power supply terminals while the rotary barrel was being rotated at about 10 rpm, whereby Ni plating layers having a thickness of about 5 μm were formed.

All of the laminates, which included the Ni plating layers formed by electroless plating or electroplating, were placed into a rotary barrel. The rotary barrel was immersed into a 33° C. Sn plating bath (Sn-235, manufactured by Dipsol Chemicals Co., Ltd.) adjusted to about pH 5.0. A current was applied to the rotary barrel at a current density of about 0.07 $A/dm^2$ for about 50 minutes through power supply terminals while the rotary barrel was being rotated at about 12 rpm, whereby Sn plating layers with a thickness of about 5 μm were formed.

The percentage of plating defects in each of the external electrodes of 100 of Samples 11, 12, 13, 14, 15, 16, 17, 18, 19, 20, 21, 22, 23, or 24 was determined on an area basis, that is, the skip rate was determined in the same manner as that described in Experiment 1. Samples 13, 14, and 16 to 24 had a skip rate of substantially 0%. The time taken to allow the skip rate of each of Samples 13, 14, and 16 to 24 to reach substantially 0% was measured. The averages of measurements of Samples 11 to 24 are shown in Table 3.

Samples 11 to 24 were subjected to a PCBT in the same manner as that described in Experiment 1. Resulting Samples 11 to 24 were checked in such a manner that the number of defectives per 100 of Samples 11, 12, 13, 14, 15, 6, 17, 18, 19, 20, 21, 22, 23, or 24 was counted. The results of this experiment are summarized in Table 3.

TABLE 3

| Samples | First distance s (μm) | Thickness of internal electrodes (μm) | Metals for forming internal electrodes | Second distance d or third distance p (μm) | Plating conditions | Skip rate (%) | Process time (minutes) | Thick end electrodes | Number of defective samples determined by PCBT |
|---|---|---|---|---|---|---|---|---|---|
| 11 | 20 | 1 | Pd | d = 2 | A | 60 | — | Not included | 100/100 |
| 12 | 20 | 1 | Ni | d = 2 | A | 90 | — | Not included | 100/100 |
| 13 | 20 | 1 | Pd | d = 1 | A | 0 | 110 | Not included | 1/100 |
| 14 | 20 | 1 | Ni | d = 1 | A | 0 | 120 | Not included | 2/100 |
| 15 | 50 | 1 | Ni | d = 1 | A | 30 | — | Not included | 100/100 |
| 16 | 20 | 1 | Ni | p = 1 | A | 0 | 90 | Not included | 2/100 |
| 17 | 50 | 1 | Ni | p = 1 | A | 0 | 90 | Not included | 3/100 |
| 18 | 20 | 0.6 | Cu | d = 0.1 | B | 0 | 90 | Not included | 2/100 |
| 19 | 20 | 0.6 | Cu | d = 0.1 | C | 0 | 90 | Not included | 2/100 |
| 20 | 20 | 0.6 | Ag | d = 0.1 | C | 0 | 90 | Not included | 3/100 |
| 21 | 20 | 0.6 | Ni | d = 0.1 | D | 0 | 90 | Not included | 2/100 |

TABLE 3-continued

| Samples | First distance s (μm) | Thickness of internal electrodes (μm) | Metals for forming internal electrodes | Second distance d or third distance p (μm) | Plating conditions | Skip rate (%) | Process time (minutes) | Thick end electrodes | Number of defective samples determined by PCBT |
|---|---|---|---|---|---|---|---|---|---|
| 22 | 20 | 1 | Ni | d = 0.1 | A | 0 | 120 | Included | 0/100 |
| 23 | 20 | 1 | Ni | p = 1 | A | 0 | 90 | Included | 0/100 |
| 24 | 20 | 0.6 | Ni | d = 0.1 | D | 0 | 90 | Included | 0/100 |

Samples 11 to 17, which include the internal electrodes having a thickness of about 1 μm, are first compared to each other. As shown in Table 1, Samples 11 and 12 have a large second distance d of about 2 μm, that is, end portions of the internal electrodes are significantly withdrawn from the end surfaces of the laminates of Samples 11 and 12. Hence, Samples 11 and 12 have a large skip rate of about 60% and about 90%, respectively. Samples 13 and 14 have a small second distance d of about 1 μm and therefore have a skip rate of substantially 0%. Although Samples 15 have a small second distance d of about 1 μm, Samples 15 have a large first distance s exceeding about 20 μm and therefore have a large skip rate of about 30%.

Samples 16 and 17 have a third distance p of about 1 μm, that is, end portions of the internal electrodes project from the end surfaces of the laminates of Samples 16 and 17. Hence, the time taken to form the external electrodes of Samples 16 and 17 is shorter as compared to Samples 13 and 14, that is, the plating efficiency of Samples 16 and 17 is high. Although Samples 17 have a large first distance s of about 50 μm, Samples 17 have a skip rate of substantially 0%.

Samples 18 to 21 are different from Samples 11 to 17 as follows: Samples 18 to 21 all have a first distance s of about 20 μm and a second distance d of about 0.1 μm, the internal electrodes of Samples 18 to 21 all have a small thickness of about 0.6 μm, metals for forming the internal electrodes of Samples 18 to 21 are as shown in Table 3, and Samples 18 to 21 were prepared under Conditions B, C, or D shown in Table 2.

Samples 18 to 21 have a skip rate of substantially 0%. This means that dense electroless plating layers can be formed even if metals for forming the internal or external electrodes are varied. Therefore, Samples 18 to 21 have high reliability.

Comparisons made between Samples 16 and 23 and those between to Samples 21 and 24 in view of the presence or absence of the thick end electrodes show that there are differences in the number of the defective items determined by the PCBT between Samples 16 and 23 and between Samples 21 and 24. That is, a small number of Samples 16 and 21, which included no thick end electrodes, were determined to be defective by the PCBT but none of Samples 23 or 24, which included the thick end electrodes, was determined to be defective by the PCBT. None of Samples 22, which included the thick end electrodes, was determined to be defective by the PCBT.

The evaluation results of Samples 14 and 16 to 24 show that the sandblasting of the laminates enable the external electrodes, which are dense, to be formed by electroless plating even if the internal electrodes primarily include a base metal, such as Ni, having low catalytic activity.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A method for manufacturing a laminated ceramic capacitor, comprising:
    a step of preparing a laminate having a substantially rectangular parallelepiped shape including a first principal surface, a second principal surface, a first end surface, a second end surface, a first side surface, and a second side surface, the first and second end surfaces and the first and second side surfaces being connected to the first and second principal surfaces, and including a plurality of stacked insulating layers and a plurality of internal electrodes that extend between the insulating layers, the plurality of internal electrodes having end portions exposed at the first or second end surface, the end portions being insulated from each other;
    a step of forming an external electrode on each of the first and second end surfaces such that the first and second end surfaces of the laminate are directly subjected to plating such that plating deposits are formed on the exposed end portions of the internal electrodes and the plating deposits are grown so as to be connected to each other; and
    a step of forming thick end electrodes electrically connected to the external electrodes such that a conductive paste including metal particles and a glass frit is applied on edge portions of the first and second principal surfaces and first and second side surfaces of the laminate and then baked, the edge portions being adjacent to the first and second end surfaces of the laminate.

2. The method according to claim 1, further comprising a step of forming plating layers over the thick end electrodes and the external electrodes by plating.

3. The method according to claim 1, wherein the external electrodes are formed by electroplating, the internal electrodes are spaced from each other in a thickness direction of the laminate, the distance between the internal electrodes adjacent to each other is about 10 μm or less, the exposed end portions of the internal electrodes are withdrawn from the first or second end surface, and the distance from each exposed end portion to the first or second end surface is about 1 μm or less.

4. The method according to claim 1, wherein the external electrodes are formed by electroplating, the internal electrodes are spaced from each other in the thickness direction of the laminate, the distance between the internal electrodes adjacent to each other is about 20 μm or less, the exposed end portions of the internal electrodes project from the first or second end surface, and the distance from the top of each exposed end portion to the first or second end surface is at least about 0.1.

5. The method according to claim 1, wherein the external electrodes are formed by electroless plating, the internal electrodes are spaced from each other in the thickness direction of the laminate, the distance between the internal electrodes adjacent to each other is about 20 μm or less, the exposed end portions of the internal electrodes are withdrawn from the first or second end surface, and the distance from each exposed end portion to the first or second end surface is about 1 μm or less.

6. The method according to claim 1, wherein the external electrodes are formed by electroless plating, the internal electrodes are spaced from each other in the thickness direction of the laminate, the distance between the internal electrodes adjacent to each other is about 50 μm or less, the exposed end portions of the internal electrodes project from the first or second end surface, and the distance from the top of each exposed end portion to the first or second end surface is at least about 0.1 μm.

* * * * *